US007734096B2

(12) United States Patent
Lee et al.

(10) Patent No.: US 7,734,096 B2
(45) Date of Patent: Jun. 8, 2010

(54) METHOD AND DEVICE FOR DISCRIMINATING OBSCENE VIDEO USING TIME-BASED FEATURE VALUE

(75) Inventors: Seung Min Lee, Daejeon (KR); Ho Gyun Lee, Daejeon (KR); Taek Yong Nam, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1043 days.

(21) Appl. No.: 11/444,002

(22) Filed: May 31, 2006

(65) Prior Publication Data

US 2007/0101354 A1 May 3, 2007

(30) Foreign Application Priority Data

Oct. 27, 2005 (KR) ...................... 10-2005-0101739

(51) Int. Cl.
*G06K 9/46* (2006.01)
*G06K 9/00* (2006.01)
*G06K 9/62* (2006.01)

(52) U.S. Cl. ....................... 382/190; 382/100; 382/159; 382/224

(58) Field of Classification Search ................. 382/190, 382/100, 159, 160, 224, 226
See application file for complete search history.

(56) References Cited

U.S. PATENT DOCUMENTS 7,421,125 B1 * 9/2008 Rees .......................... 382/181
2002/0168097 A1 * 11/2002 Neubauer et al. ........... 382/145

FOREIGN PATENT DOCUMENTS

JP 11-103449 4/1999
KR 19970014315 3/1997
KR 1999019024 3/1999
KR 1020020015492 2/2002
KR 20030067135 8/2003

(Continued)

OTHER PUBLICATIONS

Jones et al. (Statistical color models with application to skin detection, Int'l Journal of Computer Vision, Springer Netherlands, vol. 46, No. 1, Jan. 2002, p. 81-96).*

(Continued)

*Primary Examiner*—Matthew C Bella
*Assistant Examiner*—Thomas A Conway
(74) *Attorney, Agent, or Firm*—Ladas & Parry LLP

(57) ABSTRACT

A method and a device for discriminating an obscene video using a time-based feature value are provided. The method includes: forming a first time-based flow of predetermined feature values varying with the lapse of time from one or more types of videos which are normalized with a first time interval; extracting a feature value varying with time from an input video of which obsceneness is to be determined and which is normalized with a second time interval, and forming a second time-based flow of the extracted feature value; and determining the obsceneness of the input video by calculating a loss value between the first time-based flow and the second time-based flow. The videos such as movies and dramas in which many persons appear have different obscenity characteristics from that of pornography, so it is possible to enhance reliability in determination of obsceneness.

12 Claims, 5 Drawing Sheets

FOREIGN PATENT DOCUMENTS

KR 1020040082033 9/2004

OTHER PUBLICATIONS

Li et al. (Content-based movie analysis and indexing based on audio-visual cues, IEEE Trans. on Circuits and Systems for Video Technology, vol. 14, No. 8, Aug. 2004, p. 1073-1085).*

Roach et al., "Video genre classification using dynamics", ICASSP, vol. 3, 2001, pp. 1557-1560.*

Wang et al., "Detecting objectinoable videos", ACTA Automatica Sinica, Mar. 2005, vol. 31, No. 2, pp. 1-7.*

'Multi-modal Classification in Digital New Libraries' Chen et al., Proceedings of the 2004 Joint ACM/IEEE Conference on Digital Libraries, pp. 212-213.

* cited by examiner

METHOD AND DEVICE FOR DISCRIMINATING OBSCENE VIDEO USING TIME-BASED FEATURE VALUE

CROSS-REFERENCE TO RELATED PATENT APPLICATION

This application claims the benefit of Korean Patent Application No. 10-2005-0101739, filed on Oct. 27, 2005, in the Korean Intellectual Property Office, the disclosure of which is incorporated herein in its entirety by reference.

BACKGROUND OF THE INVENTION

1. Field of the Invention

The present invention relates to a method and a device for determining obsceneness of a video and blocking an obscene video by the use of information on videos with a lapse of time, and more particularly, to a method and a device for determining obsceneness of a video by the use of a nakedness pattern with a lapse of time on the basis of the fact that obscene pictures are concentrated mainly in latter section in pornographic videos unlike other genres of videos.

2. Description of the Related Art

Generally, obsceneness of a video is determined using an image sorting technology on the basis of still pictures of the video. However, when determining the obsceneness of dramas, movies, and pornography by extracting specified still pictures therefrom, the dramas, movies, and pornography may be sorted inaccurately, so the reliability of the determination is very low.

SUMMARY OF THE INVENTION

The present invention provides a method and a device for determining obsceneness of a video by extracting changes in feature values for each type of video with the lapse of time, comparing a change in feature value of an input video, the obsceneness of which to be determined, with the extracted changes in feature values, and determining a video having the most similarity, and a computer-readable recording medium having embodied thereon a computer program for the method.

According to an aspect of the present invention, there is provided a method of discriminating an obscene video using a time-based feature value, the method comprising: forming a first time-based flow of predetermined feature values varying with the lapse of time from one or more types of videos which are normalized with a first time interval; extracting the feature value varying with time from an input video, of which obsceneness should be determined and which is normalized with a second time interval, and forming a second time-based flow of the extracted feature value; and determining the obsceneness of the input video by calculating a loss value between the first time-based flow and the second time-based flow.

According to another aspect of the present invention, there is provided a device for discriminating an obscene video using a time-based feature value, the device comprising: a first normalizer classifying videos into an obscene type and a non-obscene type and normalizing the videos into N frames; a first feature extractor extracting a feature value from the normalized frames; a first time-based flow creator creating a first time-based flow of the feature value; a second normalizer receiving an input video of which obsceneness should be determined and normalizing the input video into integer times the N frames; a second feature extractor extracting the feature value from the output frames of the second normalizer; a second time-based flow creator creating a second time-based flow of the feature value output from the second feature extractor; and an obsceneness determiner determining the obsceneness of the input video through comparison between the first time-based flow and the second time-based flow.

According to another aspect of the present invention, there is provided a computer-readable recording medium having embodied thereon a computer program for a method of discriminating an obscene video using a time-based feature value, the method comprising: forming a first time-based flow of predetermined feature values varying with the lapse of time from one or more types of videos which are normalized with a first time interval; extracting the feature value varying with time from an input video, of which obsceneness should be determined and which is normalized with a second time interval, and forming a second time-based flow of the extracted feature value; and determining the obsceneness of the input video by calculating a loss value between the first time-based flow and the second time-based flow.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
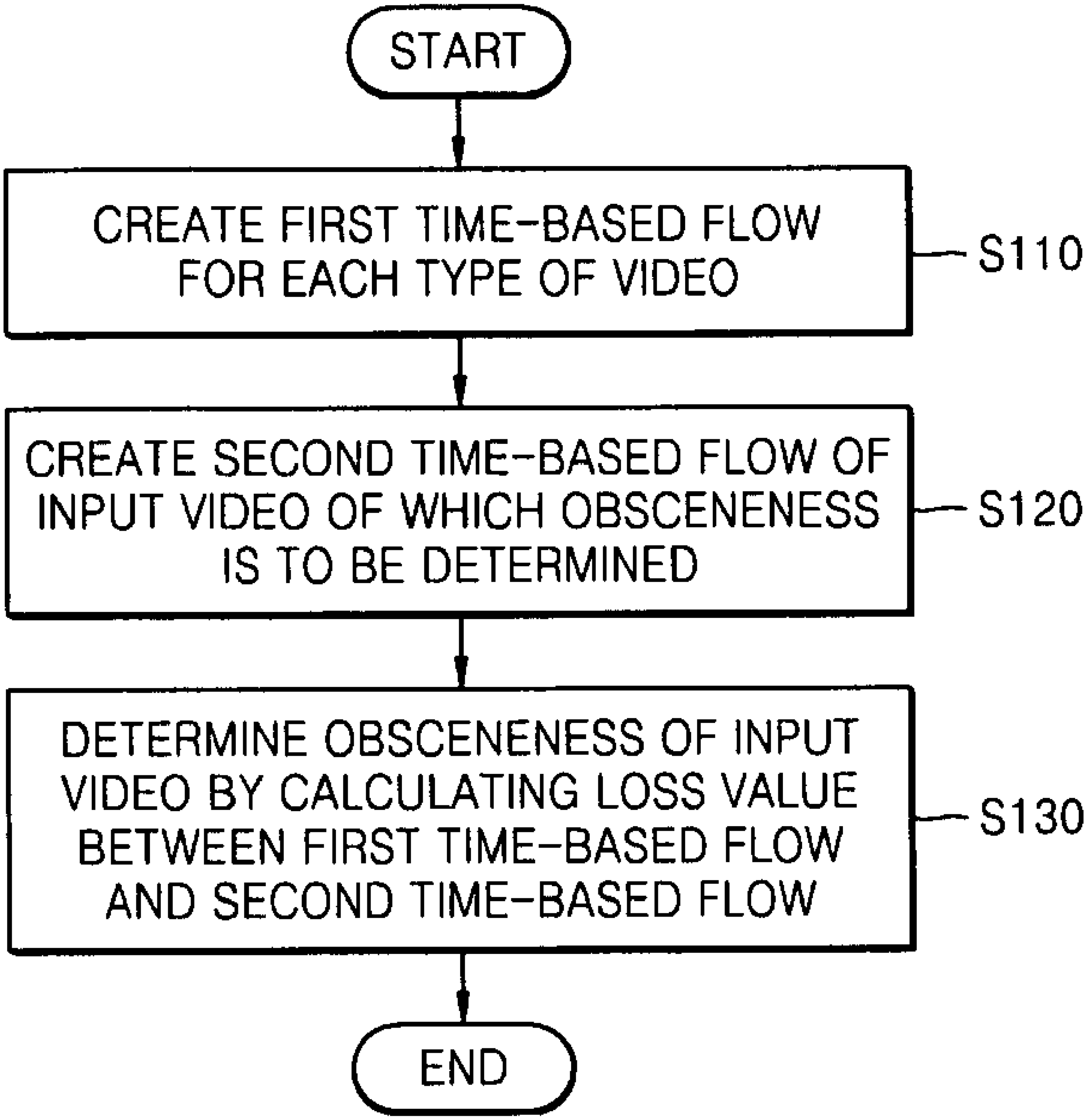
FIG. 1 is a flowchart illustrating a method of discriminating an obscene video using a time-based feature value according to an embodiment of the present invention.
Figure 2:
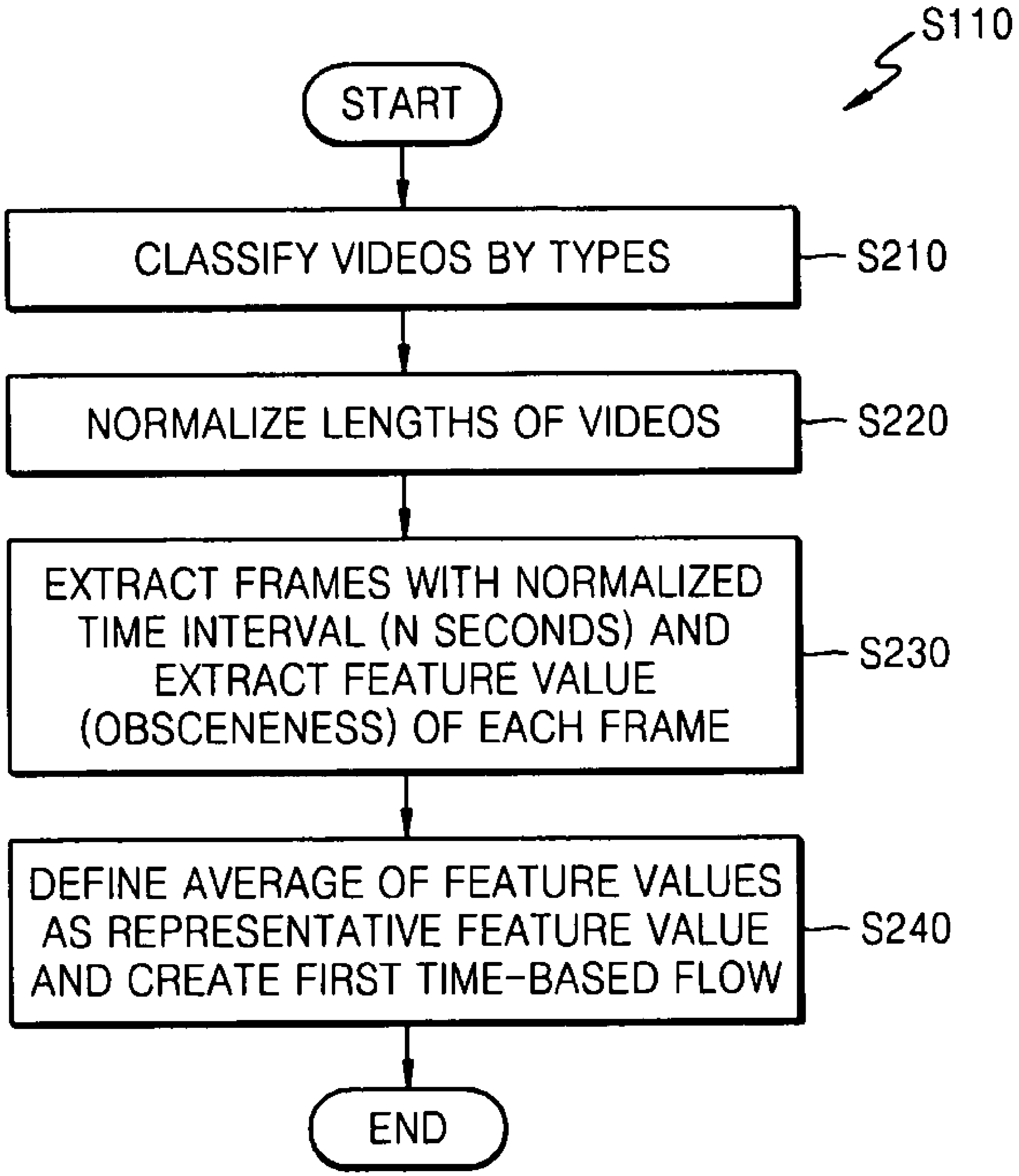
FIG. 2 is a flowchart illustrating in detail an operation of forming a first time-based flow in FIG. 1 according to an embodiment of the present invention.
Figure 3:
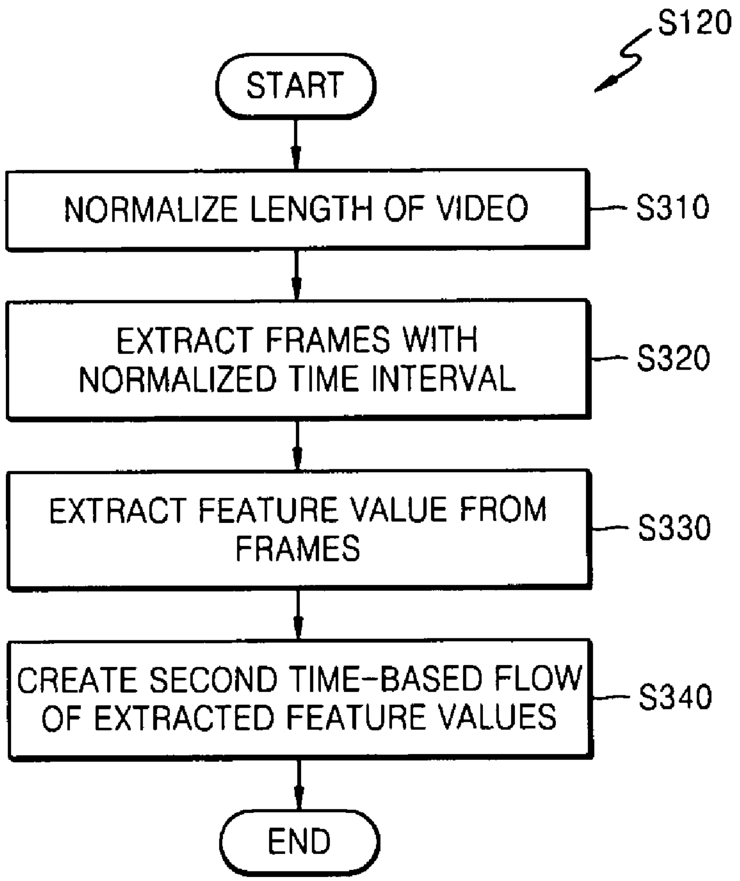
FIG. 3 is a flowchart illustrating in detail an operation of forming a second time-based flow in FIG. 1 according to an embodiment of the present invention.
Figure 4:
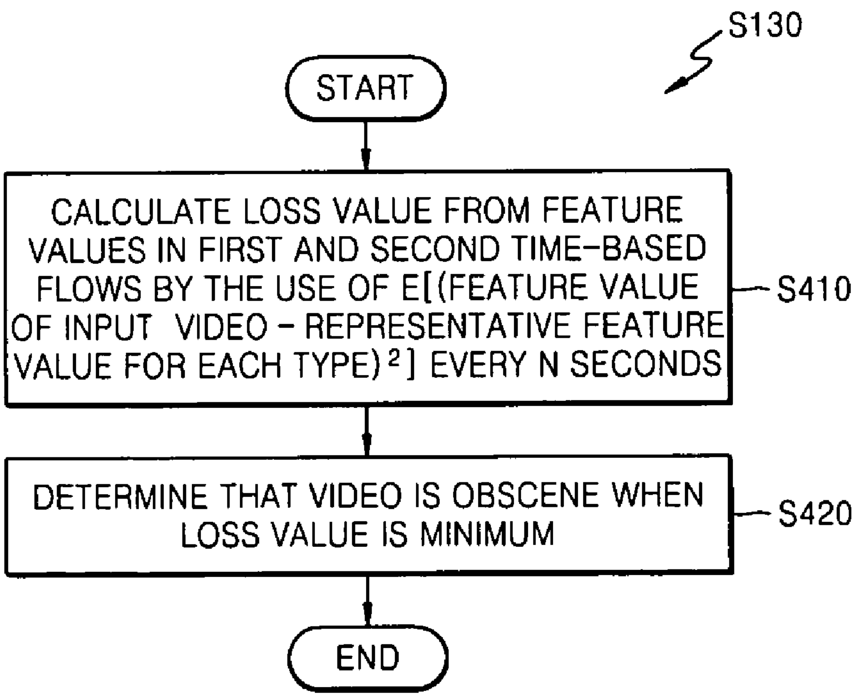
FIG. 4 is a flowchart illustrating in detail an operation of determining obsceneness in FIG. 1 according to an embodiment of the present invention.
Figure 5:
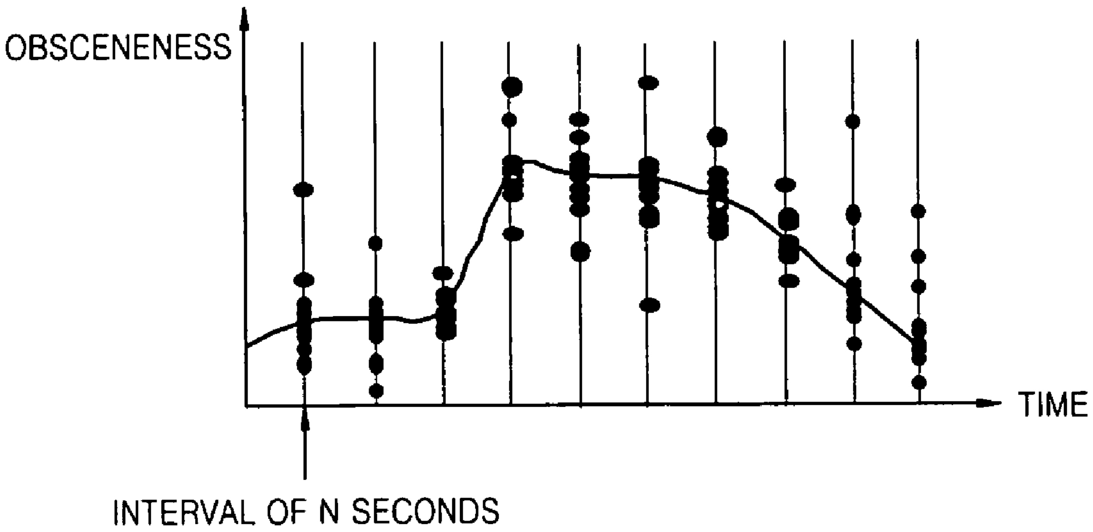
FIG. 5 is a diagram for illustrating the creation of a time-based flow of a representative feature value of a video defined as an average value of obsceneness.
Figure 6:
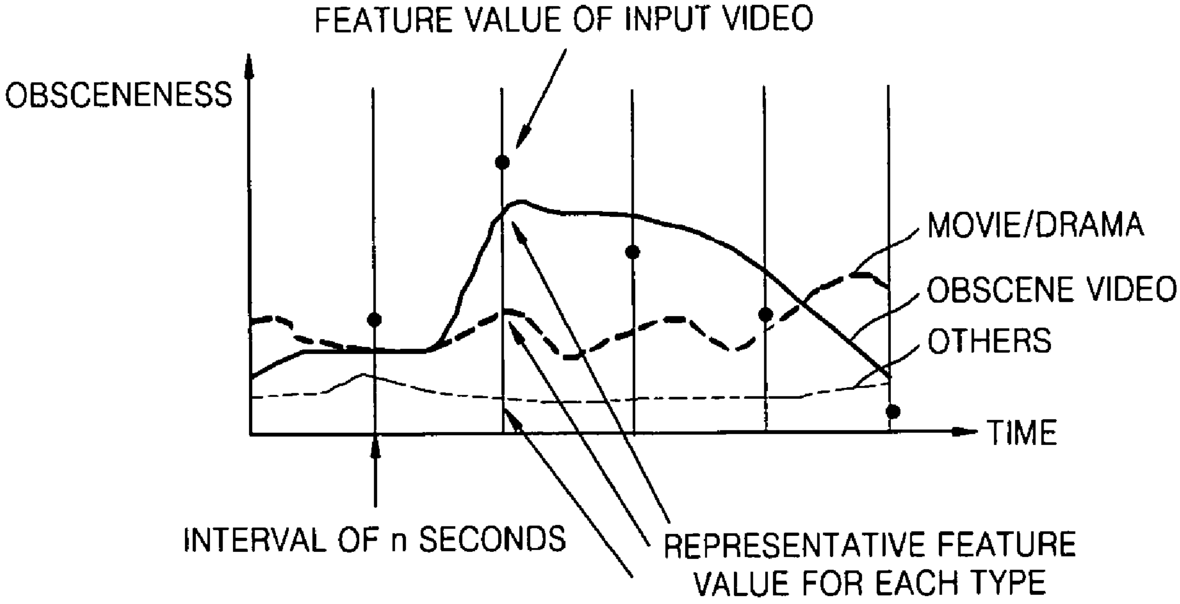
FIG. 6 is a diagram for illustrating the calculation of a loss value used for determining obsceneness according to an embodiment of the present invention.
Figure 7:
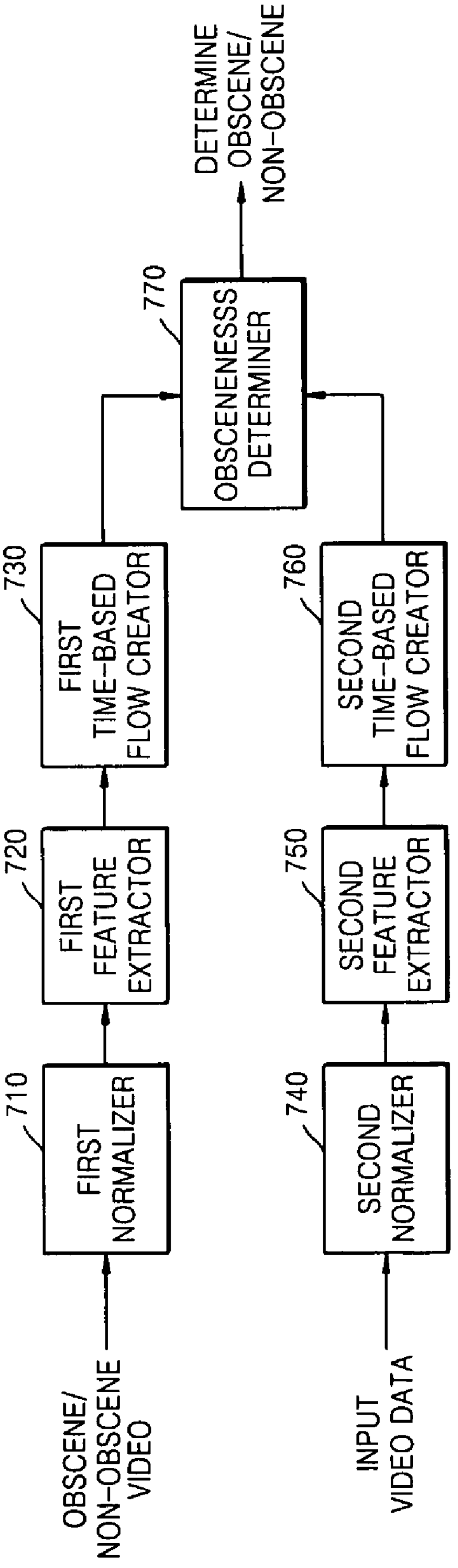
FIG. 7 is a block diagram illustrating a construction of a device for discriminating an obscene video using time-based feature values according to an embodiment of the present invention.

The present invention will be described in detail with reference to the accompanying drawings. FIG. 1 is a flowchart illustrating a method of discriminating an obscene video using a time-based feature value according to an embodiment of the present invention. FIG. 2 is a flowchart illustrating in detail an operation of forming a first time-based flow in FIG. 1 according to an embodiment of the present invention. FIG. 3 is a flowchart illustrating in detail an operation of forming a second time-based flow in FIG. 1 according to an embodiment of the present invention. FIG. 4 is a flowchart illustrating in detail an operation of determining obsceneness in FIG. 1 according to an embodiment of the present invention. FIG. 5 is a diagram for illustrating the creation of a time-based flow of a representative feature value of a video defined as an average value of obsceneness according to an embodiment of the present invention. FIG. 6 is a diagram for illustrating the calculation of a loss value used for determining obsceneness according to an embodiment of the present invention. FIG. 7 is a block diagram illustrating a construction of a device for discriminating an obscene video using time-based feature values according to an embodiment of the present invention.

Referring to FIG. 1, the present invention includes three operations. That is, there are a process of analyzing types of videos by collecting various types (genres) of existing videos and creating a first time-based flow serving as a reference for determining obsceneness of a video in operation S110, a process of creating a second time-based flow of a video of which obsceneness should be determined in operation S120, and a process of determining the obsceneness of the video by comparing the second time-based flow with the first time-based flow in operation S130.

The processes will be described in detail. The device and the method will be described together for ease of explanation and easy understanding. An operation of a first normalizer 710 will be described. First, in the process of analyzing the types of the videos in operation S110, various genres of videos are collected and classified in operation S210. The videos can be classified as obscene videos (pornography), movies/dramas, and others. A large number of videos can be collected and classified.

The lengths of the collected videos are acquired from head information thereof, the videos are normalized with a constant time interval in operation S220, and frames are extracted at the constant time interval. A first feature extractor 720 extracts feature values from the extracted frames in operation S230. For example, the collected videos are normalized with a constant time interval of 60 minutes and the frames are extracted at intervals of N seconds (for example, 10 seconds). This means that different length videos are normalized to have the constant time interval. That is, when the videos are normalized with a constant time interval of 60 minutes and the frames are extracted at intervals of 10 seconds from the videos, frames are extracted from a video having a time length of 2 hours at intervals of 20 seconds and frames are extracted from a video having a time length of 30 minutes at intervals of 5 seconds.

In the operation S230 of extracting the feature values from the extracted frames, a feature value may be a skin color, a shape, a texture and so on of an obscene image or may be a groan which can be a feature of an obscene sound. When the feature value is a skin color ratio, the skin color ratio in the extracted still frame serves as the feature value.

A first time-based flow creator 730 creates a graph of the feature value versus time, that is, a time-based flow, using the feature value in operation S240. For example, as illustrated in FIG. 5, the time-based flow is created by plotting the skin color ratios of 1000 obscene videos at intervals of 10 seconds, calculating an average of the skin color ratios every 10 seconds, and connecting the averages defined as representative feature values at those times. Graphs of the skin color ratios corresponding to the three types are created by performing the same process on movie/drama videos and the others. The graphs are used as a reference for discriminating the obscene video.

The process of determining the obsceneness of the video is basically similar to the above-mentioned process. That is, a second normalizer 740 normalizes the length of an input video in operation S310, wherein the frames are extracted from the input video by setting the time interval for extracting a frame to be longer (for example, when N is 10 seconds, the time interval is 20, 30, 40 seconds, or so, that is, an integer multiple of N) than the time interval for extracting a frame in the process of analyzing the types of videos in operation S320. When a second feature extractor 750 extracts the feature value (the same feature value as the feature value in the above-mentioned process of analyzing the types of the videos, that is, the skin color ratio in the still picture) from the extracted frames and outputs the extracted feature value, the second time-based flow creator 760 plots the extracted feature value and creates the time-based flow of the input video in operation S340.

Now, an obsceneness determiner 770 determines the obsceneness of the input video data on the basis of the time-based flows in operation S130, which will be described with reference to FIGS. 4 and 6. For example, as illustrated in FIG. 6, a loss value is calculated every n seconds (for example, 60 seconds) by calculating a difference between the representative feature value of each type obtained in the process of analyzing the types of the videos and the feature value of the input video. The time-based flow for each type of the videos is illustrated in FIG. 6, where the feature values of the input video are plotted on the time-based flow. The loss value is a mean squared difference between the representative feature value for each type of the videos and the feature value of the input video in operation S410. When the loss value relative to the obscene video is the minimum among the three loss values, it is determined that the input video is obscene and otherwise, it is determined that the input video is non-obscene.

The method of discriminating an obscene video using a time-based feature value according to an embodiment of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. In addition, a font ROM data structure according to the invention can be embodied as computer readable codes on a computer readable recording medium such as ROM, RAM, CD-ROM, magnetic tapes, floppy disks, optical data storage devices and so on.

As described above, in the method and the device for discriminating an obscene video using a time-based feature value according to the present invention, the obsceneness of a video with the lapse of time is analyzed on the basis that scenes of an obscene video with the lapse of time form a specified pattern, and then the obsceneness of the video is determined. Accordingly, it is possible to automatically discriminate obscene videos in a computer system.

In the related art of determining obsceneness of video by the use of existing image sorting technology, the accuracy of determination is very low. However, according to the present invention, it is possible to enhance the accuracy of determination of obsceneness of videos in which many persons appear, such as movies and dramas, because the obsceneness with the lapse of time of such videos is different from that of pornography.

While the present invention has been particularly shown and described with reference to exemplary embodiments thereof, the exemplary embodiments should be considered in descriptive sense only and not for purposes of limitation. Thus, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of discriminating an obscene video using a time-based feature value, the method comprising:

(a) forming a first time-based flow of predetermined feature values varying with the lapse of time according to a first time interval of one or more types of videos and the videos being normalized in their entirety according to a predetermined duration, wherein the first time-base flow represents a first pattern of obsceneness for a duration of the corresponding video;

(b) extracting the predetermined feature values varying with lapse of time according to a second time interval from an input video for which obsceneness is to be determined and the input video being normalized in their entirety according to the predetermined duration, and forming a second time-based flow of the extracted predetermined feature values, wherein the second time-base flow represents a second pattern of obsceneness for a duration of the corresponding video; and (c) determining the obsceneness of the input video by comparing the first and second time-based flows and calculating a loss value between the first time-based flow and the second time-based flow.

2. The method of claim 1, wherein step (a) comprises:

(a1) classifying the videos by types;

(a2) extracting N (where N is an integer) frames from each classified video;

(a3) extracting representative feature values from the extracted frames for each type; and (a4) forming the first time-based flow by creating a graph of the extracted representative feature values versus time for the each type.

3. The method of claim 2, wherein in step (a2), the videos, having different lengths by types, are normalized according to the predetermined duration.

4. The method of claim 1, wherein step (b) comprises;

(b1) extracting a predetermined number of frames from the input video and extracting the predetermined feature values from the extracted frames; and (b2) forming the second time-based flow by creating a graph of the extracted predetermined feature values versus time.

5. The method of claim 4, wherein in step (b1), the frames are extracted by setting the second time interval to an integer multiple of the first time interval.

6. The method of claim 1, wherein the predetermined feature value of the input video is picture information comprising colors, shapes, and textures.

7. The method of claim 1, wherein the predetermined feature value of the input video is audio information with a predetermined frequency bandwidth.

8. The method of claim 1, wherein step (c) comprises setting the loss value by calculating a difference between the representative feature value in the first time-based flow for the each type and the feature value in the second time-based flow and determining that the video is obscene when the loss value is a minimum relative to the videos classified as obscene.

9. The method of claim 8, wherein the loss value is a mean squared difference between the representative feature value in the first time-based flow for the each type and the feature value in the second time-based flow.

10. A device for discriminating an obscene video using a time-based feature value, the device comprising:

a first normalizer classifying videos into an obscene type and a non-obscene type and normalizing the videos into N frames;

a first feature extractor extracting a feature value from each of the frames of the normalized videos in their entirety;

a first time-based flow creator creating a first time-based flow of the extracted feature values and representing a first pattern of obsceneness for a duration of the corresponding video;

a second normalizer receiving an input video of which obsceneness is to be determined and normalizing the input video in its entirety into an integer multiple of the N frames;

a second feature extractor extracting the feature value from each of the frames normalized by the second normalizer;

a second time-based flow creator creating a second time-based flow of the extracted feature values output from the second feature extractor and representing a second pattern of obsceneness for a duration of the corresponding video; and an obsceneness determiner determining the obsceneness of the input video through comparison between the first time-based flow and the second time-based flow.

11. The apparatus of claim 10, wherein the first feature extractor and the second feature extractor extracts one of picture information comprising colors, shapes, and textures and audio information with a predetermined frequency bandwidth as the feature value.

12. The apparatus of claim 10, wherein when a mean squared difference between the feature value in the first time-based flow and the feature value in the second time-based flow is calculated and when the mean squared difference is a minimum relative to videos classified as obscene, the obsceneness determiner determines that the input video is obscene.

* * * * *